United States Patent [19]

Deutsch

[11] Patent Number: 5,136,998

[45] Date of Patent: Aug. 11, 1992

[54] AUTOMOTIVE CONTROL UNIT WITH INTERNAL SENSOR

[75] Inventor: Robert W. Deutsch, Sugar Grove, Ill.

[73] Assignee: Motorola, Inc., Schaumburg, Ill.

[21] Appl. No.: 475,551

[22] Filed: Feb. 6, 1990

[51] Int. Cl.$^5$ .............. F02P 5/145; F02D 41/02; F02B 77/00

[52] U.S. Cl. .................. 123/421; 123/192.2; 123/425; 123/647; 73/35

[58] Field of Search .......... 123/198 R, 478, 494, 123/647, 192 B, 425, 435, 421; 73/35

[56] References Cited

U.S. PATENT DOCUMENTS

| | | | |
|---|---|---|---|
| 3,996,914 | 12/1976 | Crall et al. | 123/198 R |
| 4,343,285 | 8/1982 | Brammer et al. | 123/647 |
| 4,557,225 | 12/1985 | Sagues et al. | 123/480 |
| 4,562,813 | 1/1986 | Okado et al. | 123/647 |
| 4,821,194 | 4/1989 | Kawamura | 123/425 |
| 5,080,067 | 1/1992 | Nakamura | 123/421 |

FOREIGN PATENT DOCUMENTS

| | | | |
|---|---|---|---|
| 0133479 | 8/1983 | Japan | 123/425 |
| 0174145 | 10/1983 | Japan | 123/494 |
| 0036767 | 2/1985 | Japan | 123/494 |

*Primary Examiner*—Tony M. Argenbright
*Attorney, Agent, or Firm*—John H. Moore

[57] ABSTRACT

In applications involving automotive engines and transmissions that are controlled by an electronic controller (13) in response to inputs from a sensor (20), the sensor (e.g., temperature sensor, accellerometer, etc.) is enclosed in the same housing that contains the electronic controller, and the housing is preferably mounted directly on the engine (or transmission). The housing acts as the medium for transmitting information concerning a measured parameter from the engine (or transmission) to the sensor.

5 Claims, 1 Drawing Sheet

AUTOMOTIVE CONTROL UNIT WITH INTERNAL SENSOR

FIELD OF THE INVENTION

This invention is directed to the field of automotive sensors that measure an operating parameter of an engine or a transmission, and control units that receive the outputs of the sensors for controlling the operation of the engine or transmission.

BACKGROUND OF THE INVENTION

The engine of a typical automotive vehicle is controlled by an electronic controller that may control ignition, air/fuel mixture, and the like. Input signals to the controller are received from sensors such as temperature sensors, accellerometers, etc. that are mounted externally of the controller. These sensors are usually mounted either on the engine or in close proximity to the device or component whose operation is to be measured.

Likewise, a conventional automotive transmission is controlled by an enclosed electronic controller that receives inputs from external sensors, such as clutch pressure switches.

The foregoing arrangements are not entirely satisfactory in that an undesirably large amount of wiring is required to couple electrical signals from the sensors to their associated control units. Further, such arrangements tend to require too many connectors and too may sensors, thus leading to a potentially less reliable system.

OBJECTS OF THE INVENTION

It is a general object of the invention to provide an improved arrangement of sensors and their associated control units.

It is a more specific object of the invention to provide a technique for interfacing the control units and their associated sensor(s) so as to substantially reduce the wiring and connectors required between the control units and their sensors, and in some cases, to reduce the number of required sensors.

DESCRIPTION OF THE PREFERRED EMBODIMENT

According to a broad aspect of the present invention, a sensor is mounted within the same housing that contains an electronic controller, and that housing is mounted on an engine or transmission so that the sensor can measure a parameter of the engine or transmission. The sensor may also simultaneously measure an operating parameter (e.g. temperature) of the controller.

Figure 1:
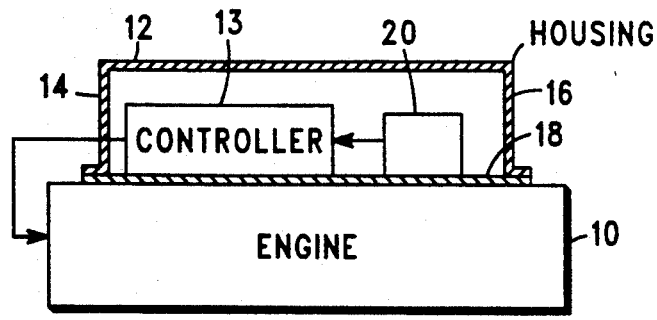
FIG. 1 is a schematic drawing that shows an electronic controller and a sensor mounted on an engine according to the invention.

In the embodiment shown in FIG. 1, there is shown an engine 10 that is controlled by a controller 13. Such controllers are usually mounted somewhat remote from the engine, but the illustrated controller, with its housing, is preferably mounted so that it is fixed to the engine.

To control the engine, the controller 13 will typically receive input signals from sensors that measure engine temperature, engine knock, etc. As mentioned previously, these sensors are conventionally situated near the component being measured, but remote from the controller itself.

In the illustrated embodiment, the controller, 13 has a housing composed of outer walls 12, 14, 16, and 18. The outer wall 18 is preferably mounted directly on the engine 10. This wall 18 is selected to be at least partially transmissive to the parameter (or parameters) of the engine that are to be measured. For example, if engine temperature is to be measured, then the wall 18 of the controller's housing may be thin-walled steel for transmitting heat from the engine to the wall's inner surface. A similar wall may be used to transmit engine noise, or mechanical vibrations, from the engine to the inside of the housing.

A sensor 20 is contained within the controller's housing, and it is mounted so that it is in communication with the housing wall (18) that abuts the engine. In the embodiment of FIG. 1, the sensor 20 is mounted directly on the wall 18. A significant aspect of this arrangement is that the wall 18 is the medium for communicating changes in the engine's measured operating parameter to the sensor 20.

Advantageously, the sensor 20 is protected by the same housing that protects the controller 13, and no long wires or connectors are required between the sensor 20 and the controller.

It is contemplated that the sensor 20 may be an accellerometer, in which case the wall 18 will transmit engine noise (mechanical vibration) to the sensor 20. The controller 13 receives the output signal from the accellerometer, processes it, and preferably uses it to control engine balance and/or engine knock.

Figure 2:
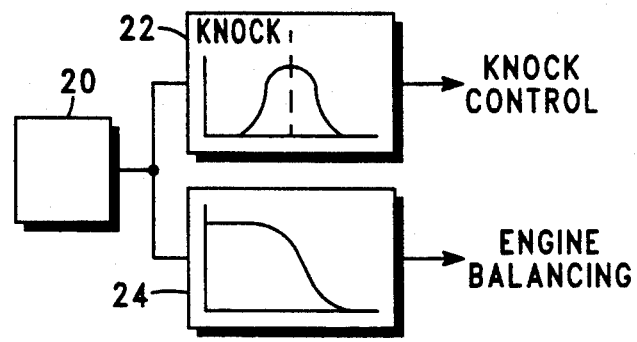
FIG. 2 is a schematic drawing showing how the output of an accellerometer, situated in the configuration shown in FIG. 1, may be processed to control engine knock and engine balance.

To accomplish this, the sensor's output signal is preferably filtered by a bandpass filter 22 as shown in FIG. 2, and the filtered signal is used by the controller 13 to control engine knock using conventional techniques. The accellerometer's output is also filtered by a low pass filter 24, and then used by the controller to adjust engine fuel mixture and/or ignition to control engine balance. This arrangement is particularly well suited for engines without a valve train so that engine noise is not masked by noise from the valve train.

Figure 3:
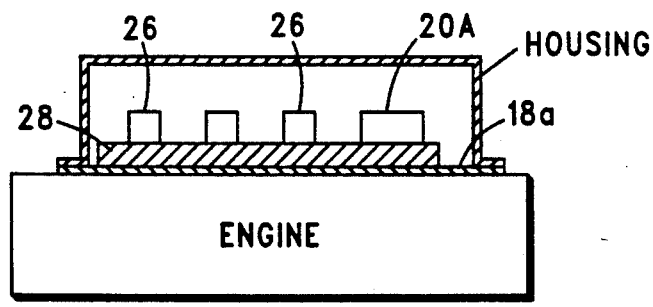
FIG. 3 shows a temperature sensor/controller mounted on an engine such that the sensor measures engine temperature, plus the temperature of heat-generating components within the controller.

Referring now to FIG. 3, another arrangement is shown for measuring an engine parameter, but in this case the sensor 20a also measures an operating parameter of the controller. The only part of the controller that is shown in FIG. 3 comprises heat-generating components 26 (e.g. transistors). These components are mounted on a thermally conductive substrate 28 (made of polyimide or ceramic, e.g.) which, in turn, is mounted directly on the wall 18a of the housing. The sensor 20a (in this case, a temperature sensor) is also mounted on the substrate 28 so that the sensor 20a senses heat generated by the components 26, plus heat generated by the engine. This arrangement allows the controller to estimate the temperature increase due to the heat generated by the components 26, and substract this temperature increase from the combined temperature measurement to obtain an estimate of the temperature of the engine. The controller would then use the estimated temperature of the engine to control a thermostat or to otherwise modify the engine's performance. If a high level of heat is sensed by the sensor 20a in response to over-dissipation by the components 26 and high engine temperature, the controller may reduce engine temperature by controlling fuel or ignition advance, limiting engine speed, or, if necessary, shutting the engine down.

Figure 4:
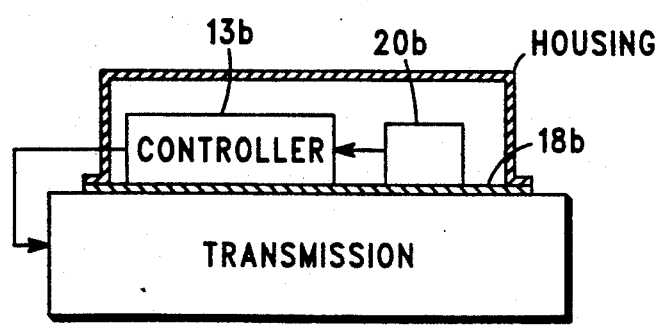
FIG. 4 shows a sensor/controller mounted on an automotive transmission.

Referring now to FIG. 4, the previously discussed techniques are shown as being applied to an automotive transmission. In this case, the transmission operates under the control of an electronic controller 13b. The controller 13b is enclosed by the illustrated housing which has an outer wall 18b that is preferably mounted directly on the transmission. A sensor 20b, preferably an accellerometer, is also contained by the housing and is mounted on the same bottom wall 18b. This arrangement allows the sensor to measure mechanical vibration in the wall 18 that is induced by gear-shifting in the transmission. Consequently, the controller 13b can control the transmission in response to the output signals from the sensor 20b, without the need for multiple clutch pressure switches in the transmission.

As shown by the foregoing description, the present technique for interfacing an electronic controller with its associated sensor(s) and engine (or transmission) can substantially reduce the amount and complexity of the wiring and connectors that are otherwise required. In some cases, the number of sensors that are required can also be reduced.

Although the invention has been described in terms of preferred embodiments, it will be obvious to those skilled in the art that many alterations and variations may be made without departing from the invention. Accordingly, it is intended that all such alterations and variations be considered as within the spirit and scope of the invention as defined by the appended claims.

I claim:

1. A method of interfacing an electronic controller and a sensor with an engine that is at least partially controlled by the electronic controller, and wherein the electronic controller receives an input from the sensor which measures and operating parameter of the engine, the method comprising:

providing a controller housing having an outer wall that is transmissive to the measured parameter;

mounting the sensor within the housing directly on the housing's outer wall so that the same, single housing contains both the controller and the sensor; and mounting the housing on the engine such that the housing's outer wall becomes a medium for communicating changes in the measured parameter to the sensor.

2. The method as set forth in claim 1 wherein the sensor is an accellerometer that provides an output signal that is useful for controlling engine knock.

3. The method as set forth in claim 2, including band-pass filtering the accellerometer's output signal and using the filtered output signal to control engine knock, and low-pass filtering the accellerometer's output signal and using the low-pass filtered signal to control engine balance.

4. Apparatus for use with an engine that is at least partially controlled by an electronic controller, the apparatus comprising:

a housing enclosing the controller and having an outer wall that is transmissive to engine noise;

an accellerometer mounted within the housing such that the same, single housing contains both the controller and the accellerometer, and such that the accellerometer is in communication with the housing's outer wall, the housing being mounted on the engine such that the housing's outer wall communicates engine noise to the accellerometer.

5. Apparatus for use with an engine that is at least partially controlled by an electronic controller that has at least one heat generating component, the apparatus comprising:

a housing enclosing the controller and having an outer wall that is heat transmissive, the outer wall of the housing being mounted to and in thermal contact with the engine;

a thermally conductive substrate mounted inside the housing, the substrate having a bottom surface that is fixed to said wall of the housing, and having a top surface on which the controller's heat-generating component is mounted; and a temperature sensor mounted within the housing and on the top surface of the substrate, whereby the temperature sensor can measure both engine heat and heat generated by said heat-generating component.

* * * * *